US012619964B1

(12) United States Patent
Chavez et al.

(10) Patent No.: US 12,619,964 B1
(45) Date of Patent: May 5, 2026

(54) SYSTEM AND METHOD FOR DIGITAL INTEGRATION OF FINANCIAL FEATURES

(71) Applicant: United Services Automobile Association (USAA), San Antonio, TX (US)

(72) Inventors: Carlos JP Chavez, San Antonio, TX (US); Andrea Marie Richardson, San Antonio, TX (US); Janelle Denice Dziuk, Falls City, TX (US); Oscar Roberto Tijerina, San Antonio, TX (US); Valmore M. Smith, San Antonio, TX (US); Gregory David Hansen, San Antonio, TX (US); Gregory Brian Meyer, San Antonio, TX (US); Courtney St. Martin, Duluth, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 18/596,119

(22) Filed: Mar. 5, 2024

Related U.S. Application Data

(63) Continuation of application No. 17/186,317, filed on Feb. 26, 2021, now Pat. No. 11,935,018.

(60) Provisional application No. 62/983,295, filed on Feb. 28, 2020.

(51) Int. Cl.
| | |
|---|---|
| *G06Q 20/10* | (2012.01) |
| *G06F 21/62* | (2013.01) |
| *G06N 5/04* | (2023.01) |
| *G06Q 10/1093* | (2023.01) |
| *G06Q 40/02* | (2023.01) |

(52) U.S. Cl.
CPC .......... *G06Q 20/108* (2013.01); *G06F 21/62* (2013.01); *G06N 5/04* (2013.01); *G06Q 10/1093* (2013.01); *G06Q 40/02* (2013.01); *G06Q 2220/00* (2013.01)

(58) Field of Classification Search
CPC .................................................... G06Q 20/10
See application file for complete search history.

(56) References Cited

U.S. PATENT DOCUMENTS

| | | | |
|---|---|---|---|
| 10,445,732 B2 | 10/2019 | Oberheide et al. | |
| 10,552,823 B1 | 2/2020 | Woodward et al. | |
| 11,935,020 B1 * | 3/2024 | Fakhraie | H04L 63/102 |
| 2001/0032182 A1 | 10/2001 | Kumar et al. | |
| 2004/0225752 A1 | 11/2004 | O'Neil et al. | |
| 2009/0271303 A1 | 10/2009 | Weng et al. | |
| 2014/0012743 A1 * | 1/2014 | Hanson | G06Q 30/04 |
| | | | 705/40 |
| 2016/0078430 A1 | 3/2016 | Douglas et al. | |
| 2016/0171492 A1 | 6/2016 | Carrott | |
| 2017/0017939 A1 * | 1/2017 | Killoran, Jr. | G06Q 20/227 |
| 2017/0039499 A1 | 2/2017 | Darst | |

(Continued)

*Primary Examiner* — Nga B Nguyen
(74) *Attorney, Agent, or Firm* — Fletcher Yoder, P.C.

(57) ABSTRACT

Systems and methods for digital integration of financial features between a user and a service provider is provided. For example, if a user device is registered with the service provider, the user device may receive an electronic notification (e.g., calendar entry) related to outstanding account operations. The user device may be able to complete the outstanding account operations by accessing the electronic notification and embedded financial information.

20 Claims, 2 Drawing Sheets

(56)        References Cited

U.S. PATENT DOCUMENTS

| | | | |
|---|---|---|---|
| 2017/0244618 | A1 | 8/2017 | Deluca et al. |
| 2018/0039952 | A1 | 2/2018 | Dintenfass et al. |
| 2018/0189744 | A1 | 7/2018 | Frank et al. |
| 2019/0311354 | A1 | 10/2019 | Kulkarni et al. |
| 2019/0311355 | A1 | 10/2019 | Kulkarni et al. |
| 2020/0051163 | A1* | 2/2020 | Bhat ..................... G06F 9/451 |
| 2020/0296082 | A1* | 9/2020 | Killoran, Jr. ....... G06Q 20/4014 |
| 2021/0295403 | A1* | 9/2021 | Chan ................. G06Q 10/1093 |

* cited by examiner

SYSTEM AND METHOD FOR DIGITAL INTEGRATION OF FINANCIAL FEATURES

CROSS REFERENCE RELATED TO APPLICATIONS

This application is a continuation of U.S. Non-Provisional application Ser. No. 17/186,317, entitled "SYSTEM AND METHOD FOR DIGITAL INTEGRATION OF FINAN-CIAL FEATURES," filed Feb. 26, 2021, which claims priority from and the benefit of U.S. Provisional Application Ser. No. 62/983,295, entitled "SYSTEM AND METHOD FOR DIGITAL INTEGRATION OF FINANCIAL FEA-TURES," filed Feb. 28, 2020, each of which is herein incorporated by reference in its entirety for all purposes.

BACKGROUND

The present disclosure relates generally to systems and methods for integrating a user device with a service provider via financial communication. More particularly, the financial communication may include electronic notifications (e.g., push notifications, email notifications, etc.) that result in calendar entries and reminders to facilitate performance of financial functions (e.g., regular payments) by the user device with respect to the service provider.

This section is intended to introduce the reader to various aspects of art that may be related to various aspects of the present disclosure, which are described and/or claimed below. This discussion is believed to help provide the reader with background information to facilitate a better under-standing of the various aspects of the present disclosure. Accordingly, it is understood that these statements are to be read in this light, and not as admissions of prior art.

Digital banking, digitalization of banking activities (e.g., withdrawals, deposits, payments) through the application of technologies, has allowed for the automation of financial operations and features. In particular, it is now recognized that integrating a user device with a service provider via financial communication may be desirable. Financial com-munication such as calendar entries and reminders to per-form financial functions (e.g., regular payments) by the user device with respect to the service device may improve efficiency and avoid multiple levels of authentication (e.g., dual authentication) when conducting financial operations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to integrat-ing a user device with a service provider via financial communication. In a particular embodiment, financial com-munication may include calendar entries or reminders sent to a user device to perform financial operations (e.g., regular payments) with respect to the service provider. The user device (e.g., smartphone) may be registered with the service provider to receive the financial communication (e.g., regu-lar calendar entry or reminder for a payment). In some embodiments, the user device may include decryption ser-vices to decode the financial communication to successfully perform the financial operation.

In one embodiment, a method for digitally integrating financial features is provided. In accordance with the method, a user device may receive an electronic notification from an account provider. The electronic notification may include an account operation associated with a service provider in response to the user device being authorized by the service provider. The method also includes the user device decoding, via a decryption service, the electronic notification to access information related to the account operation. Further, the method includes the user device performing, the account operation based on accessing the information from the electronic notification.

In a further embodiment, a system may include a com-puting device associated with a service provider and a user device. The user device is configured to: receive an elec-tronic notification from an account provider in response to the user device being authorized; decode, via a decryption service, the electronic notification to access information related to one or more outstanding account operations between one or more accounts associated with the user device and the service provider; and perform the one or more outstanding account operations in response to accessing the information.

In an additional embodiment, a non-transitory, machine-readable medium, comprising machine-readable instructions that, when executed by one or more processors of a machine, cause the machine to receive an electronic notification from an account provider. The electronic notification may include an account operation associated with a service provider and one or more accounts. The machine-readable instructions that, when executed by one or more processors of a machine, cause the machine to also: decode, via a decryption service of a user device, the electronic notification; access informa-tion related to the account operation in response to decoding the electronic notification; and perform, via the user device, the account operation based on accessing the information from the electronic notification.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclo-sure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figures 1, 2:
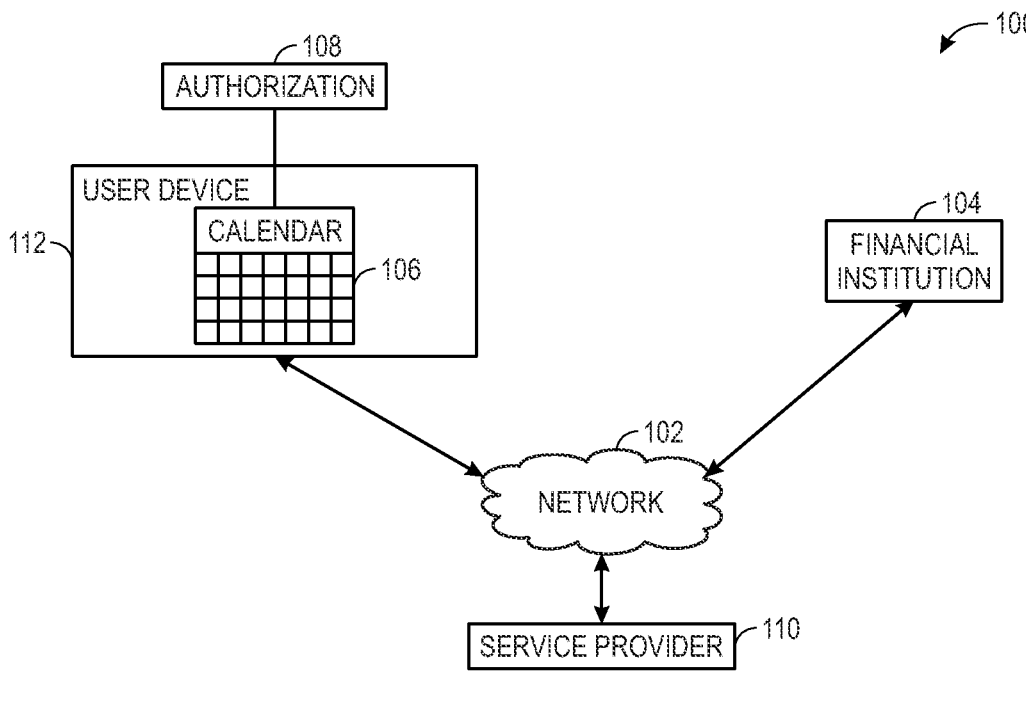
FIG. 1 illustrates a block diagram of an example financial system associated with digital integration of a user device with a service provider via financial communication, in accordance with an embodiment of the present disclosure.
FIG. 2 illustrates a block diagram associated with regis-tering user devices via the example system of FIG. 1, in accordance with an embodiment of the present disclosure.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, "account operation" and "financial operation" may be used interchangeably.

As discussed in greater detail below, the present embodiments described herein relate to integrating a user device (e.g., smart phone of a customer) with a service provider (e.g., computing device of a merchant) via financial communication. In a particular embodiment, financial communication may include electronic notifications (e.g., calendar entries or reminders) sent to the user device to perform financial operations (e.g., regular payments) with respect to the service provider. In some embodiments, the electronic notifications (e.g., calendar entries and reminders) may include a URL or link relevant to an account (e.g., banking account) associated with a user of the user device. The user may be able to perform a financial operation associated with the electronic notification by accessing this URL or link in the calendar entry or reminder. Embedding the URL or link into the electronic notification (e.g., calendar entry or reminder) prevents multiple levels of authentication (e.g., dual authentication) because the user being authorized or having access to the calendar entry or reminder serves as a level of authentication. By accessing the electronic notification, an authorized user may also have access to the URL or link that is associated with a bank account of the user, for example. Calendar entries and reminders related to outstanding financial operations associated with a user's account may be generated and accessible by a user device once the user device is authorized. That is, after the user device is registered with a computing device of the service provided or validated by the service provider or an account provider (e.g., bank), the user may access the calendar entries and reminders to execute the outstanding financial operations via the one or more user devices. Any number of user devices may be associated with a user and registered with the service provider. Non-limiting examples of outstanding financial operations may include bill payments, withdrawals, deposits, and so forth. After the user device is registered with the service provider, the user device may include decryption services to decode and have access information from the URL or link. By accessing information (e.g., bank account information of a user) via the URL or link, the user may be able to perform the financial operation associated with the electronic notification (e.g., calendar entry or reminder). In this way, the user may be thoroughly integrated with the service provider with respect to performing financial operations.

With the preceding in mind, FIG. 1 depicts a block diagram of an example financial system 100 associated with digital integration of a user device 112 and a service provider 110 via financial communication. As mentioned above, the financial communication may include electronic notifications, such as calendar entries or reminders 106 sent to the user device 112 to perform financial functions (e.g., regular payments, withdrawals, deposits) with respect to the service provider 110. In some embodiments, the calendar entries or reminders 106 may be a part of internet calendar scheduling (ICS) file, which is a calendar file saved in a universal calendar format and used by various email and calendar programs. The calendar entries or reminders 106 may be generated based on outstanding financial operations between the user account associated with the user device 112 and the service provider 110. As used herein, a user may own or be associated with a user account and the user device 112. The user account associated with the user device 112 may be maintained by or otherwise associated with a respective financial institution 104 (e.g., a bank, credit card issuer, account provider, or other institution where funds can be deposited, held, withdrawn, and/or transferred to others). Financial operations or transactions of the user account may be associated with the service provider 110 (e.g., any entity that provided good or services in exchange for funds, or any entity that processes transaction for those entities). Both the financial intuition 104 and the service provider may include respective computing devices. The respective computing devices may be implemented as a single computing device or as multiple computing devices.

The computing devices associated with the financial institution 104 and the service provider 110 may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the computing device as a physical device, implementations are not so limited. In some examples, the computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The user device 112 may also include any suitable type of computing device. In some instances, the user device 112 is a portable computing device such as a smartphone, tablet computer, wearable device, implanted computer, automotive computer, portable gaming platform, and so forth, the location of which may change throughout the course of a day or other period of time as the user moves about. In some embodiments, the user device 112 may be a less portable type of computing device, such as a desktop computer, laptop computer, game console, smart appliance, and so forth.

In particular, the user device 112, the computing device associated with the financial institution 104, and the computing device associated with the service provider may communicate with one another, or with other computing devices, using one or more networks 102. Such networks 102 may include public networks such as the internet, private networks such as an institutional or personal intranet, or any combination of private and public networks. The networks 102 may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

Because the financial system 100 integrates the user device 112, the financial institution 104, and the service provider 110 via financial communication, the user may be able to effectively perform financial operation (e.g., paying a bill to the service provider 110, retrieve user account information, or push a payment card into a virtual wallet) by accessing the calendar entry or reminder 112. Such integration improves efficiency in conducting banking operations between the user device 112 and the service provider 110 by eliminating multiple levels of authentication. That is, rather than having more than one authentication processes for accessing an electronic notification (e.g., calendar entries or reminder 106) and a link or URL embedded within the electronic notification to retrieve information related to a financial operation, a user, who has access to the electronic notification, also may have access to the embedded link and corresponding information related to the financial operation. Validation of an identity of the user device 112 based on a device ID and determining that the user device is registered with the service provider 110 may serve as a level of authentication. Embedding the link into a calendar entry or reminder 106 avoids multiple levels of authentication (e.g., dual authentication) because the user device 112 being authorized or having access to the calendar entry or reminder 106 serves as a level of authentication. Based on accessing the electronic notification as well as the information by selecting the embedded URL or link, the user device 112 may perform a financial operation. By way of example, the information related to the financial operation may include account data of the user such as actual and predicted balances associated with the user account. The actual and predicted balances may be based on a history of the user account. For example, the financial institution or account provider 104 may maintain a history of transactions or payments between various service providers 110 and one or more user accounts. The financial institution or account provider 104 may determine an actual balance for each of the user accounts by averaging the transaction data for each of the user accounts. Further, the financial institution or account provider 104 may predict a future balance for each of the user accounts based on analyzing aggregated data of expected or scheduled payments and transactions.

In order for the user device 112 to receive the calendar entry or reminder 106, an authorization process 108 may be conducted. The authorization process 108 may involve determining whether the user device 112 is registered with the service provider 110. In some embodiments, the service provider 110 may determine whether the user device 112 is valid and authorized to receive the financial communication (e.g., electronic communication indicative of an account or financial operation) based on device ID of the user device 112. The service provider 110 may notify the financial institution or the account provider 104 whether the user device 112 is authorized to receive the financial communication. In some embodiments, the financial institution or the account provider 104 may transmit an electronic communication (e.g., internet calendar schedule file including an account operation) if the financial institution or the account provider 104 receives a notification from the service provider 110, where the notification indicates that user device 112 is authorized or valid. In other embodiments, the account provider 104, itself, may determine whether the user device is authorized to receive the financial communication by identifying a device ID of the user device 112. If the user device 112 is indeed registered with the service provided 110 or validated by the service provider 110 and/or account provider 104 based on a device ID the user device 112 may decrypt the received calendar reminder or entry 106 to access the information related to the financial operation.

With the preceding in mind, FIG. 2 illustrates a block diagram associated with registering the user device 112 with the service provider 110 in light of the authorization process 108. In some embodiments, the user device 112 may be a plurality of devices associated with the user, and more than one user device 112 associated with the user may be registered with the service provider 110. In this example, device 1 (202) and device 2 may be registered with the service provider 110. Various devices may be registered with the service provider 110 based on the authentication process 108 to determine whether a user device 112 may be authorized based on a valid device ID. As illustrated in this example, after device 1 (202) is verified to be registered with the service provider, an internet calendar schedule file may be added to the device 1 (arrow 206). As mentioned above after the user device 112 receives the internet calendar schedule file 204, the user device may be capable of accessing information within the internet calendar schedule file 204 to perform financial operations (e.g., paying a bill to the service provider 110, retrieve the user account information, and push a payment card into a virtual wallet) via the internet calendar schedule file 204. The internet calendar schedule file 204 may include a URL, link 208, and so forth relevant to the user account. That is, by selecting the URL or link 208, the user may have access to his or her account information via the user device 112. For example, after an outstanding regular payment to the service provider 110 is identified, an internet calendar schedule file 204 with dates and expected payment amounts may be added or integrated with the user's current calendar. Additionally, the internet calendar schedule file 204 may include information associated with the available balance in one or more user accounts. In some embodiments, after performing one or more financial operations associated with the internet calendar schedule file 204, the internet calendar schedule file 204 may be removed from the user device 112.

On the other hand, according to this example, device 3 (210) may not be registered with the service provider 110. In some embodiments, device 3 (210) may not have a valid device ID associated with the user device 112. Thus, an internet calendar schedule file may not be added (arrow 214) to the device 3 (210). Without an internet calendar schedule file (e.g., ICS 212), the device 3 (210) may not have access to perform financial operations as a part of the financial system 100. By validating user devices based on device ID, for example, the authorization process 108 maintains security by preventing fraud, identity theft, and the like.

Figure 3:
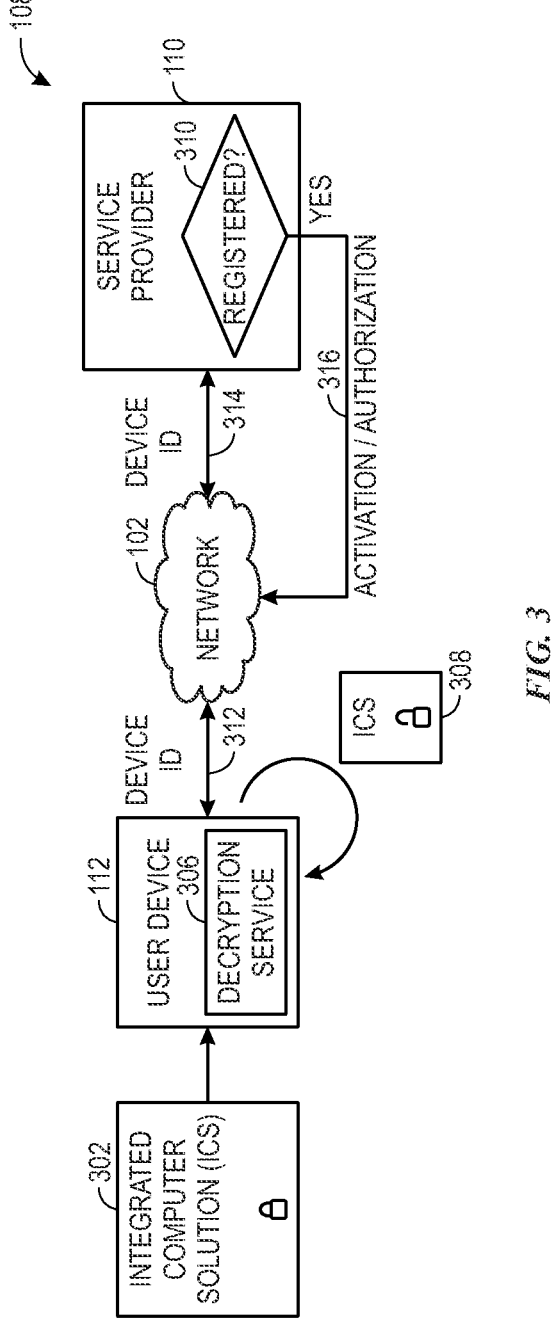
FIG. 3 illustrates a block diagram of authenticating a user device with respect to a service provider and financial communications via the example system of FIG. 1, in accordance with an embodiment of the present disclosure.

After the user device 112 has been registered with the service provider 110, the user device 112 may perform the financial operation associated with the internet calendar schedule file after decoding encrypted information within the internet calendar schedule file. As such, FIG. 3 depicts a block diagram of authenticating a user device 112 with respect to the service provider 110 and the financial communication in light of the authorization process 108. The service provider 110 may determine whether the user device 112 is registered with the service provider 110 based on verifying whether the device ID (314) is associated with the user device 112 with respect to the network 102. If the user device 112 is indeed registered with the service provider 112, then the user device 112 may be activated or authorized (316) to receive an internet calendar schedule file 302. In some embodiments, the internet calendar schedule file 302 may be encrypted or locked for security purposes. To obtain financial information encoded in the internet calendar schedule file 302 such as the user account information, the user device 112 may decode the internet calendar schedule file 302. The user device 112 may include decryption services 306, which may be used to decode the internet calendar schedule file 302. The user device 112 may decrypt the internet calendar schedule file 302 by verifying the device ID (312) of the user device 112 with the network 102. In some embodiments, the user device 112 may receive a decryption key from the service provider 110 to decrypt the encoded information of the internet calendar schedule file 302 after the service provider 110 has validated the identity of the user device 112. After the user device 112 has decrypted the encoded information and the internet calendar schedule file 302 is decrypted or unlocked, the user device 112 may perform financial operations (e.g., paying bills to the service provider 110) associated with the decrypted internet calendar schedule file 308.

In an additional embodiment, the system 100 may include integration between a plurality of user devices and a plurality of service provides via financial communication. In other embodiments, financial communication may include pictorial and/or text reminders, pictorial and/or text calendar entries, and any combination thereof associated with financial operations. In another embodiment, the calendar entries and reminders may be generated based on dates and keywords scanned from an e-bill, receipt, and the like. In some embodiments, an image or video representation corresponding to the financial or account operation may be displayed to a user.

In another embodiment, the system 100 may maintain a history or record data related to a user's spending habits. Non-limiting examples of data associated with spending habits may include the frequency that the user purchases products or services, the types of products and services purchased by the user, and from which service provider 110 the user purchases the products and services. Based on the data collect on spending habits, the financial system 100 may provide the user with a relevant reminder or calendar entry associated with the user's purchase and the service provider 110, via an authenticated user device (e.g., the user device 112). For example, one or more sensors, one or more cameras, or both may be disposed about a smart refrigerator associated with the user. The one or more sensors, the one or more cameras, or both may collect data on the products within the smart refrigerator. Based on the types of products in the smart refrigerator and factors such as risk tolerance and investing parameters, the financial system 100 may provide relevant reminders or calendar entries associated with financial habits of the user. In some instances, the user may be recommended a stock portfolio based on investing parameters and the user's spending habits.

In a further embodiment, the financial system 100 may monitor spending habits of individuals within a network (e.g., a user and his or her neighbors in a residential community). Data associated with spending habits of each individual is secure. Particular spending histories and financial data is available to a particular individual associated with the particular spending histories and financial data in the network. In one embodiment, the financial system 100 may monitor spending habits of multiple individuals in the network via internet of things (IOT) inputs of the multiple individuals. Based on data collected associated with the multiple individuals spending habits, the financial system 100 may provide relevant reminders or calendar entries associated with financial information to each individual in the network. For example, the financial 100 may provide each individual with options to purchase in bulk (e.g., group coupons or offer, bulk deals). Over time, the financial system 100 may modify an algorithm associated with determining and providing the multiple individuals with options to purchase in bulk based on changed spending habits of the multiple individuals in the network.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A method, comprising:

registering, via a user device, a device identity (ID) corresponding to the user device with a service provider;

receiving, via the user device and based on the device ID being registered, a calendar notification from an account provider, the service provider, or both, wherein the calendar notification comprises a controllable command to trigger performance of an account operation associated with the service provider remote to the user device on a scheduled date, wherein the controllable command is encrypted for execution by the user device corresponding to the registered device ID;

in response to receiving the calendar notification, inserting a calendar entry representative of the calendar notification in an electronic calendar of the user device; and performing the account operation remote to the user device conditioned on user-device-side authentication, by:

receiving a decryption key based upon the device ID being registered with the service provider;

decrypting the controllable command; and on the scheduled date, launching the decrypted controllable command via the user device for execution by the service provider without requiring further authentication.

2. The method of claim 1, wherein the account operation comprises one or more scheduled payments, one or more scheduled withdrawals, one or more scheduled deposits, or any combination thereof.

3. The method of claim 1, wherein the calendar notification comprises an instruction for the user device to provide a reminder associated with the controllable command and the scheduled date.

4. The method of claim 1, wherein the calendar notification comprises a link to access one or more accounts of a user associated with the user device.

5. The method of claim 4, comprising displaying one or more actual balances and one or more predicted balances associated with the one or more accounts in response to accessing the link.

6. The method of claim 1, wherein the account operation comprises providing one or more predicted balances associated with one more accounts based on:

analysis of aggregated data of scheduled payments;

an averaging of historical payment data; or both.

7. The method of claim 1, wherein the calendar notification is generated in response to an outstanding account operation between an account of a user associated with the user device and the service provider.

8. The method of claim 7, comprising removing the calendar notification in response to completion of the outstanding account operation.

9. A system, comprising:

a computing device associated with a service provider; and a user device configured to:

register a device identity (ID) corresponding to the user device with the service provider;

receive, based on the device ID being registered, a calendar notification from an account provider, the service provider, or both, wherein the calendar notification comprises a controllable command to trigger performance of an account operation associated with the service provider remote to the user device on a scheduled date, wherein the controllable command is encrypted for execution by the user device corresponding to the registered device ID;

in response to receiving the calendar notification, insert a calendar entry representative of the calendar notification in an electronic calendar of the user device; and perform the account operation remote to the user device conditioned on user-device-side authentication, by:

receiving a decryption key based upon the device ID being registered with the service provider;

decrypting the controllable command; and on the scheduled date, launching the decrypted controllable command via the user device for execution by the service provider without requiring further authentication.

10. The system of claim 9, wherein the calendar notification comprises an internet calendar schedule (ICS) file.

11. The system of claim 9, wherein one or more accounts comprise one or more bank accounts of a user associated with the user device.

12. The system of claim 9, wherein the account operation corresponds to an outstanding account operation comprising one or more scheduled bill due dates, one or more scheduled bill payments, one or more scheduled withdrawals, one or more scheduled deposits, or any combination thereof.

13. The system of claim 9, wherein the user device is configured to receive the calendar notification in response to the account provider receiving an indication that the device ID is registered.

14. The system of claim 9, wherein the user device is configured to receive the calendar notification in response to the service provider authorizing the user device by determining the device ID is registered.

15. The system of claim 9, wherein the account operation comprises providing one or more predicted balances associated with one more accounts based on:

analysis of aggregated data of scheduled payments;

an averaging of historical payment data; or both.

16. The system of claim 9, wherein the user device is configured to receive an image or video representation corresponding to the account operation.

17. A non-transitory, machine-readable medium, comprising machine-readable instructions that, when executed by one or more processors of a machine, cause the machine to:

register a device identity (ID) with a service provider;

receive, based on the device ID being registered, a calendar notification from an account provider, the service provider, or both, wherein the calendar notification comprises a controllable command to trigger performance of an account operation associated with the service provider remote to the user device on a scheduled date, wherein the controllable command is encrypted for execution by a user device corresponding to the registered device ID;

in response to receiving the calendar notification, insert a calendar entry representative of the calendar notification in an electronic calendar of the user device; and perform the account operation remote to the user device conditioned on user-device-side authentication, by:

receiving a decryption key based upon the device ID being registered with the service provider;

decrypting the controllable command; and on the scheduled date, launching the decrypted controllable command via the user device for execution by the service provider without requiring further authentication.

18. The non-transitory, machine-readable medium of claim 17, comprising machine-readable instructions, that when executed by the one or more processors, cause the machine to receive the calendar notification in response to the service provider or the account provider determining that the device ID corresponding to the user device is registered.

19. The non-transitory, machine-readable medium of claim 17, wherein the account operation comprises one or more scheduled bill payments, one or more scheduled withdrawals, one or more scheduled deposits, or any combination thereof.

20. The method of claim 1, wherein the launching the decrypted controllable command via the user device for execution by the service provider without requiring further authentication causes performance of the account operation without requiring a user of the user device to provide an account name, an account password, or both.

\* \* \* \* \*